(12) United States Patent
Ross et al.

(10) Patent No.: US 10,343,762 B2
(45) Date of Patent: Jul. 9, 2019

(54) FUSELAGE MOUNTED ENGINE WITH WING STOW

(71) Applicant: Bell Helicopter Textron, Inc., Fort Worth, TX (US)

(72) Inventors: Brent Chadwick Ross, Flower Mound, TX (US); Steven Ray Ivans, Ponder, TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 318 days.

(21) Appl. No.: 15/272,141

(22) Filed: Sep. 21, 2016

(65) Prior Publication Data

US 2018/0079484 A1    Mar. 22, 2018

(51) Int. Cl.

| | |
|---|---|
| *B64C 3/38* | (2006.01) |
| *B64C 29/00* | (2006.01) |
| *B64C 39/02* | (2006.01) |
| *B64C 3/56* | (2006.01) |

(52) U.S. Cl.
CPC ............... *B64C 3/38* (2013.01); *B64C 3/56* (2013.01); *B64C 29/0033* (2013.01); *B64C 39/024* (2013.01); *B64C 2201/021* (2013.01); *B64C 2201/108* (2013.01)

(58) Field of Classification Search
CPC ..... B64C 3/38; B64C 39/024; B64C 29/0033; B64C 3/56; B64C 2201/021; B64C 2201/108
See application file for complete search history.

(56) References Cited

U.S. PATENT DOCUMENTS

| | | | |
|---|---|---|---|
| 2,289,224 A | 7/1942 | Swanson et al. | |
| 2,623,713 A | 12/1952 | Foster | |
| 3,063,660 A | 11/1962 | Jarrell | |
| 3,430,894 A * | 3/1969 | Levinsky | B64C 3/385 |
| | | | 244/211 |
| 4,691,878 A | 9/1987 | Vaughan et al. | |
| 5,337,974 A * | 8/1994 | Rumberger | B64C 3/40 |
| | | | 244/39 |
| 7,802,754 B2 | 9/2010 | Karem | |
| 8,083,172 B2 | 12/2011 | Karem | |
| 9,102,401 B2 | 8/2015 | Collins et al. | |

(Continued)

FOREIGN PATENT DOCUMENTS

| | | |
|---|---|---|
| KR | 100822366 B1 | 4/2008 |
| WO | 2009102739 A2 | 8/2009 |

(Continued)

OTHER PUBLICATIONS

Partial European Search Report; European Application No. 16203012.6; dated Jun. 9, 2017; 16 pages.

(Continued)

*Primary Examiner* — Valentina Xavier

(74) *Attorney, Agent, or Firm* — Lightfoot & Alford PLLC

(57) ABSTRACT

An aircraft has a fuselage, an engine disposed within the fuselage, a rotatable wing disposed above the fuselage and selectively rotatable about a wing rotation axis, and a plurality of interconnect driveshafts disposed within the rotatable wing, and at least one drive system component that is connected between the engine and the interconnect driveshaft is disposed along the wing rotation axis.

8 Claims, 17 Drawing Sheets

(56) References Cited

U.S. PATENT DOCUMENTS

| | | | | |
|---|---|---|---|---|
| 2007/0241228 A1* | 10/2007 | Haynes | ............... | B64C 29/0033 244/7 A |
| 2012/0211608 A1* | 8/2012 | Pancotti | ............. | B64C 29/0033 244/7 C |
| 2014/0263854 A1* | 9/2014 | Ross | ................... | B64C 29/0033 244/7 A |
| 2017/0327205 A1* | 11/2017 | Paulson | ................. | B64C 11/26 |
| 2018/0079502 A1* | 3/2018 | Foskey | ............... | B64C 29/0033 |

FOREIGN PATENT DOCUMENTS

| | | |
|---|---|---|
| WO | 2010104509 A1 | 9/2010 |
| WO | 2011018697 A1 | 2/2011 |
| WO | 2013015295 A1 | 1/2013 |

OTHER PUBLICATIONS

European Search Report; European Application No. 16203012.6; dated Nov. 9, 2017; 7 pages.

\* cited by examiner

FUSELAGE MOUNTED ENGINE WITH WING STOW

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some cases, mounting an engine of an aircraft within a fuselage can be desirable to simplify rotor pylon and nacelle configuration, reduce space constraints, and/or reduce aircraft moment of inertia for improved maneuverability. In some cases, it can also be desirable to provide for stowing of an aircraft by rotating wings and/or folding wing extensions. However, providing an engine in a fuselage combined with rotating wings and/or folding wing extensions has remained a technical challenge.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
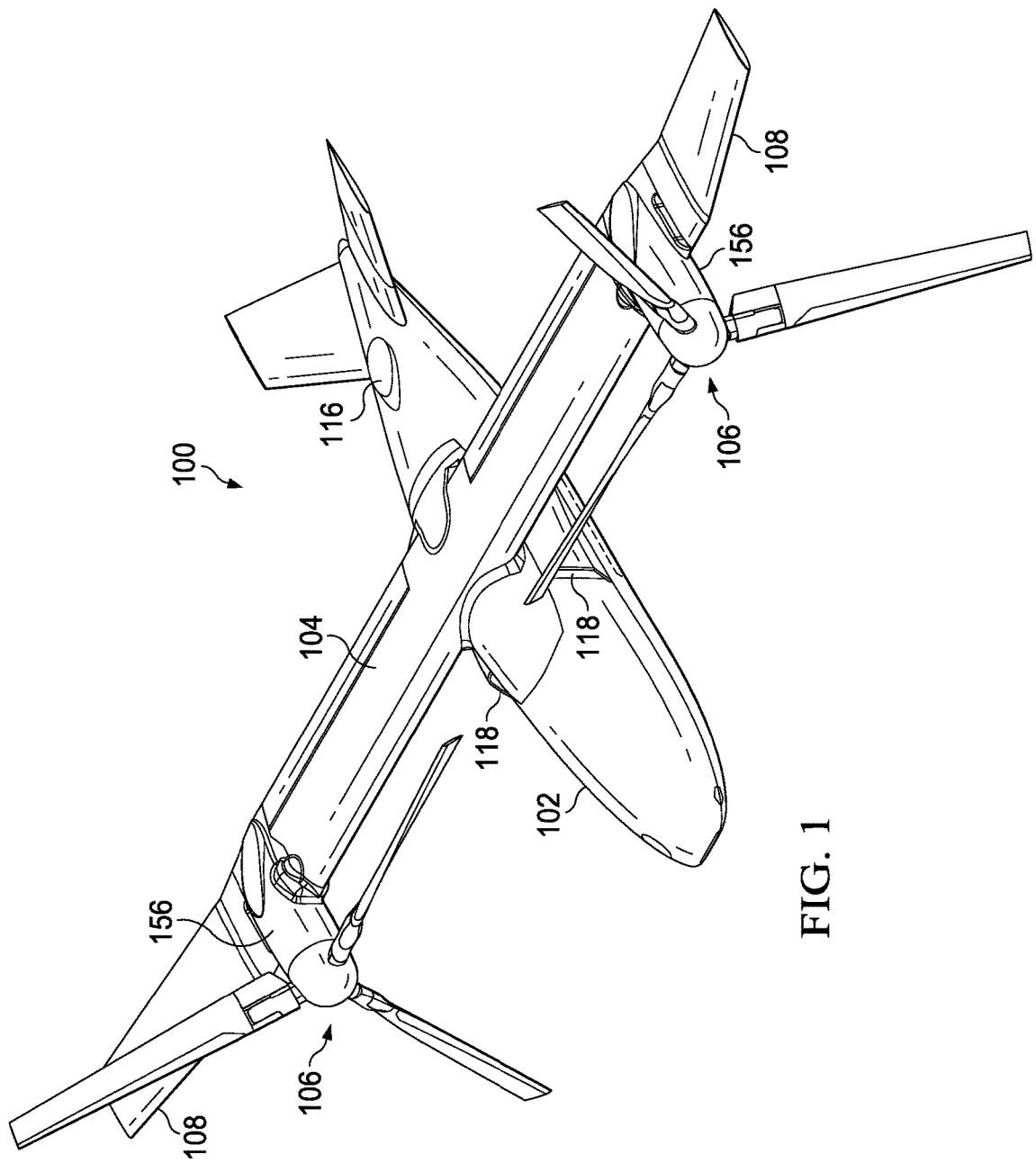
FIG. 1 is an oblique top right view of an aircraft according to the disclosure with the aircraft in a cruise configuration.
Figure 2:
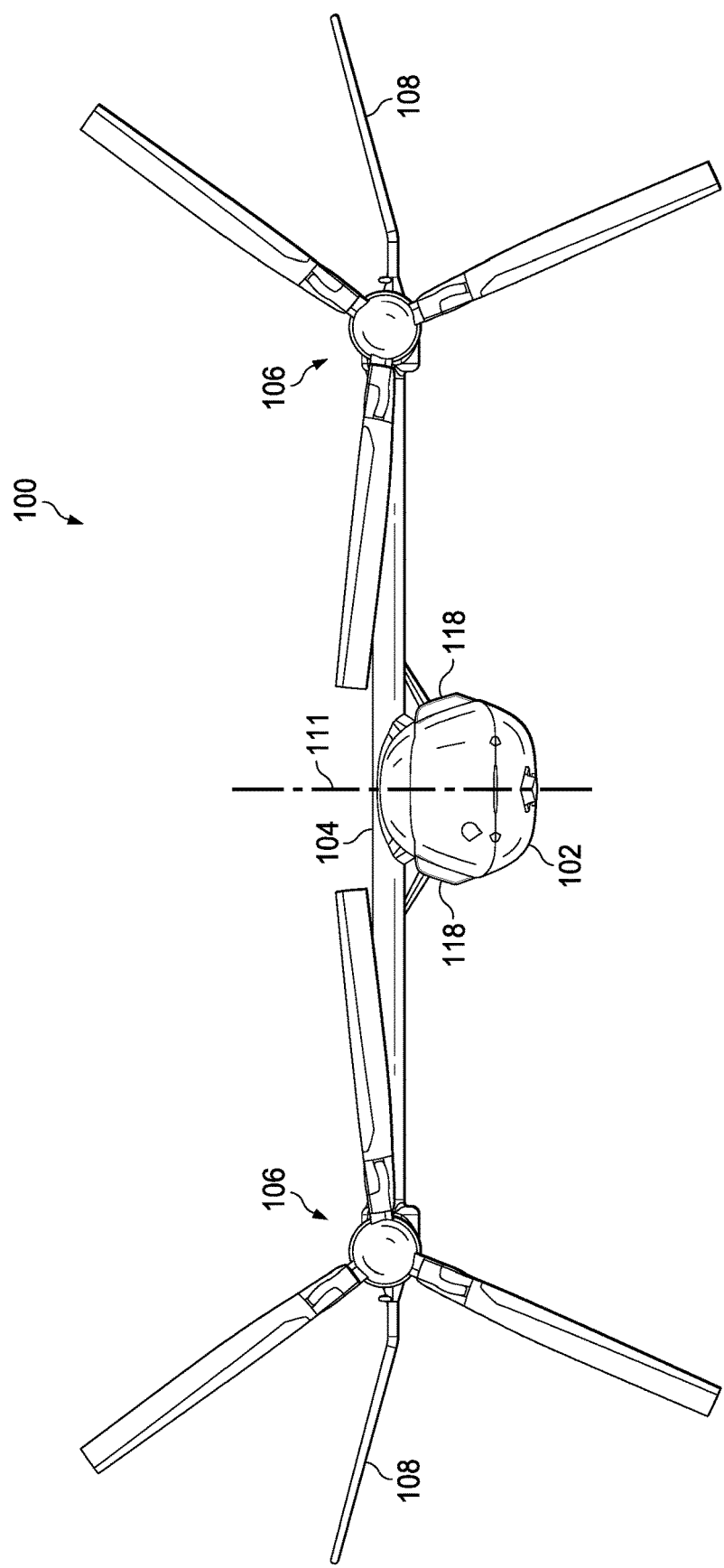
FIG. 2 is a front view of the aircraft of FIG. 1 in a cruise configuration.
Figure 3:
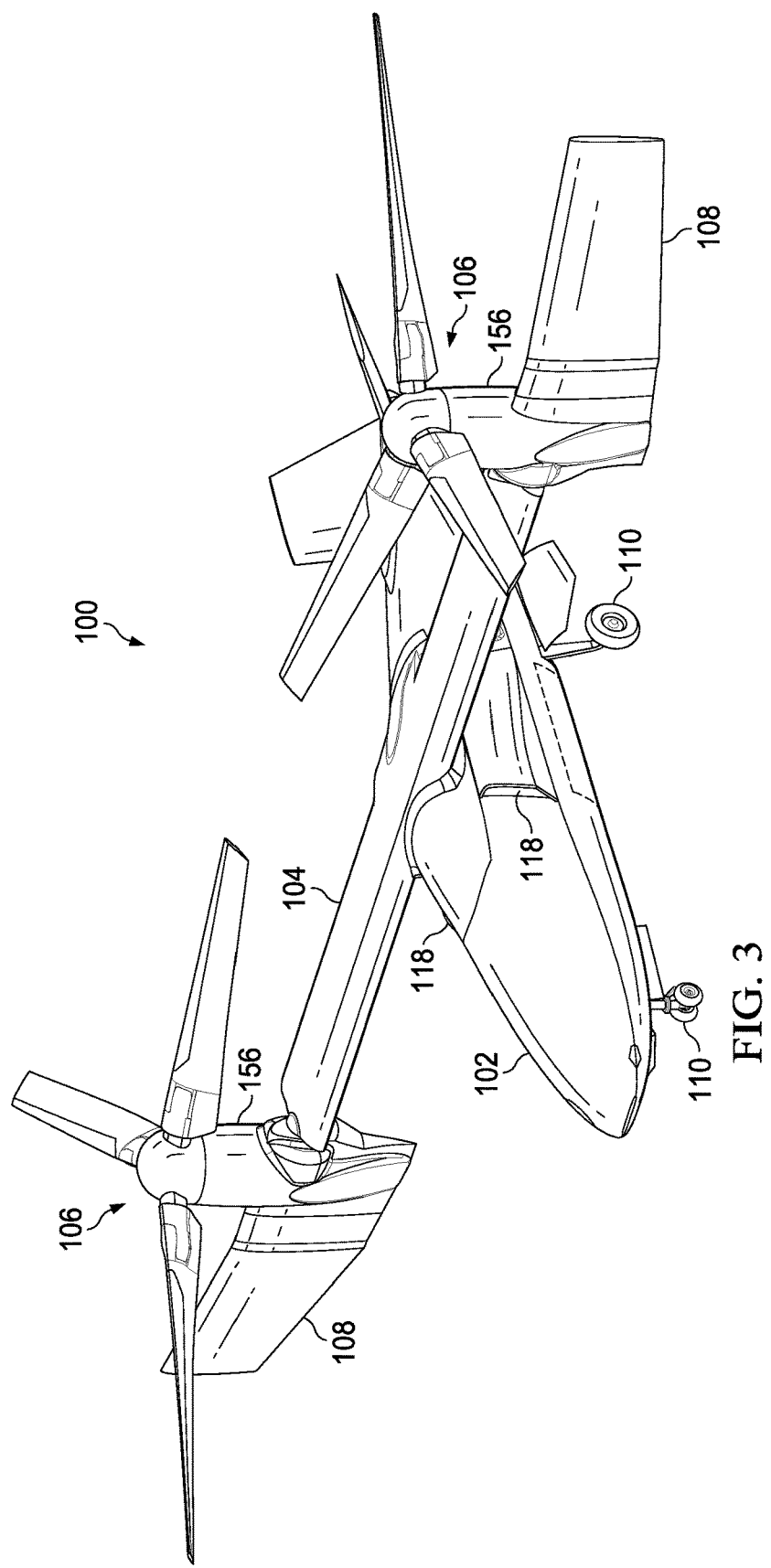
FIG. 3 is an oblique top right view of the aircraft of FIG. 1 with the aircraft in a vertical takeoff and landing (VTOL) configuration.
Figure 4:
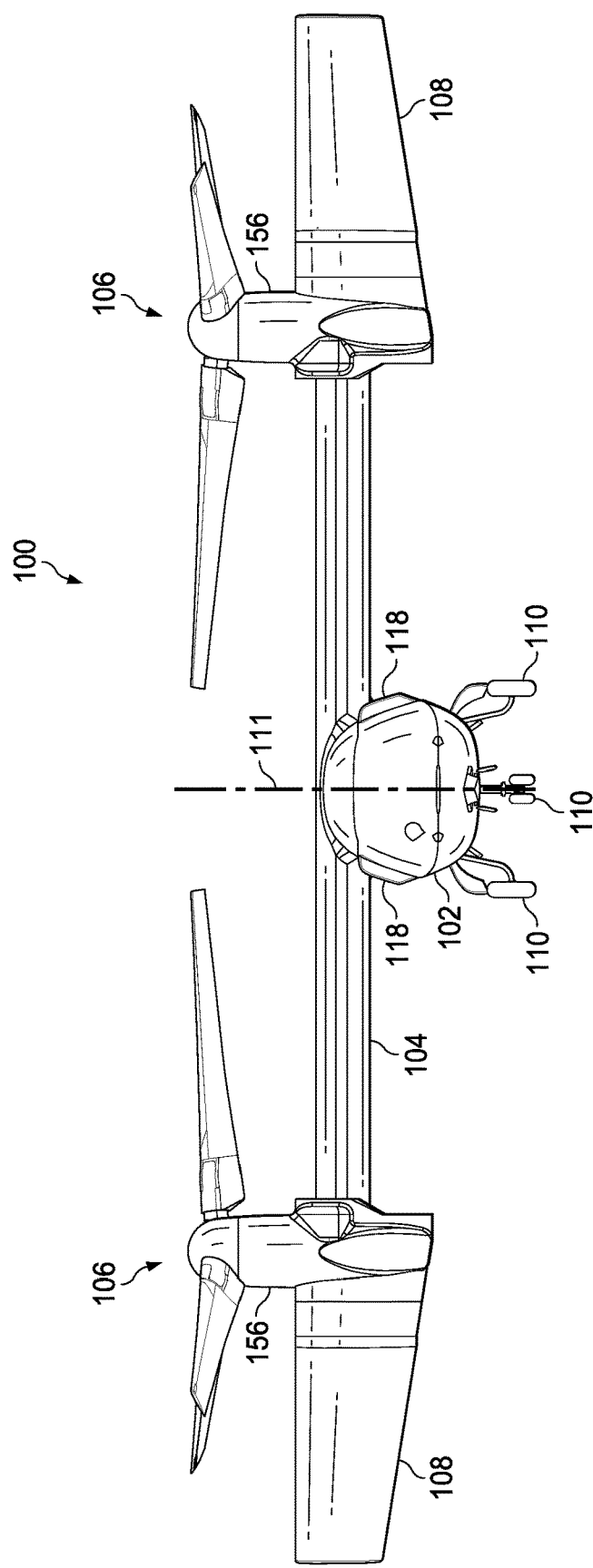
FIG. 4 is a front view of the aircraft of FIG. 1 with the aircraft in a VTOL configuration.
Figure 5:
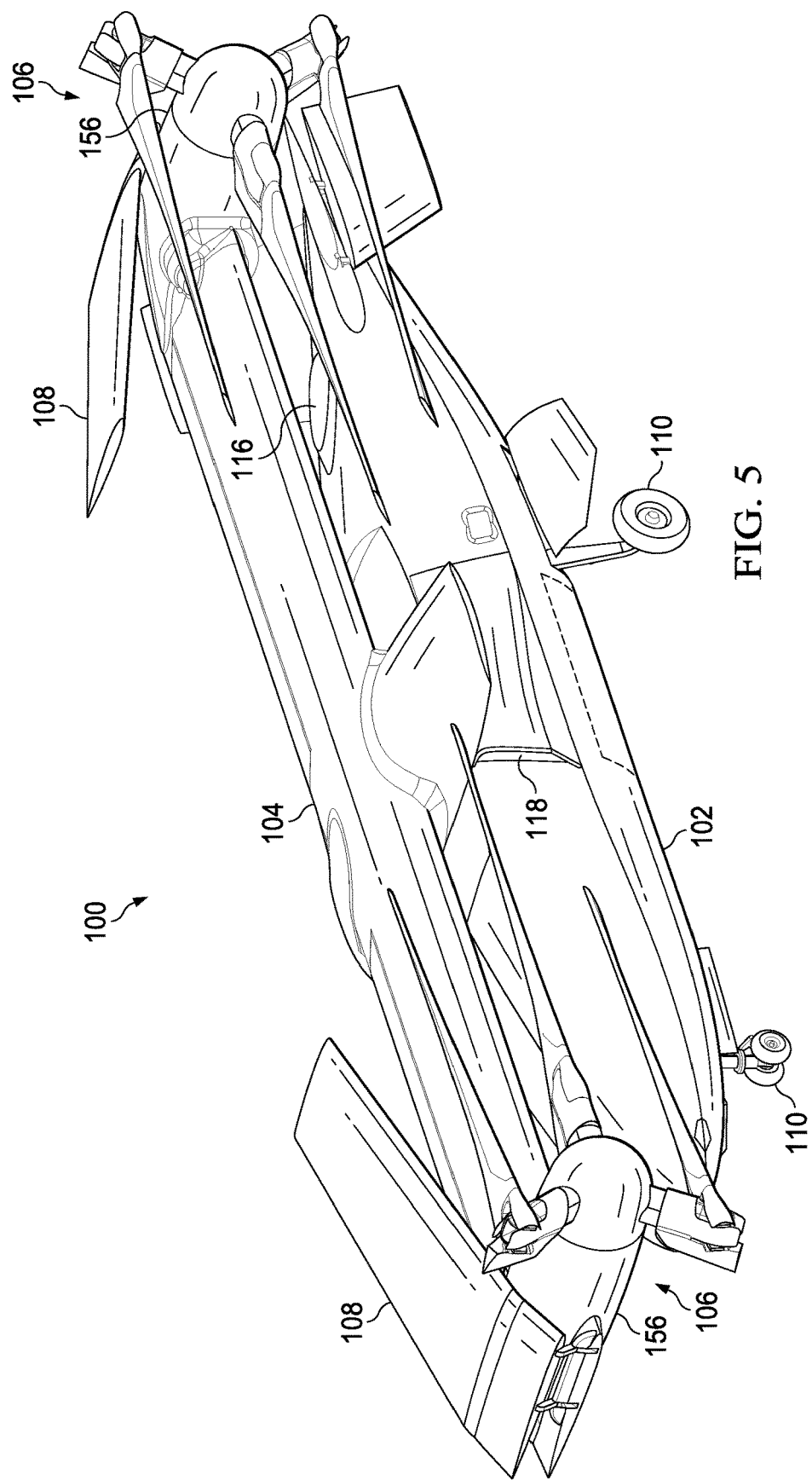
FIG. 5 is an oblique top right view of the aircraft of FIG. 1 with the aircraft in a folded configuration.
Figure 6:
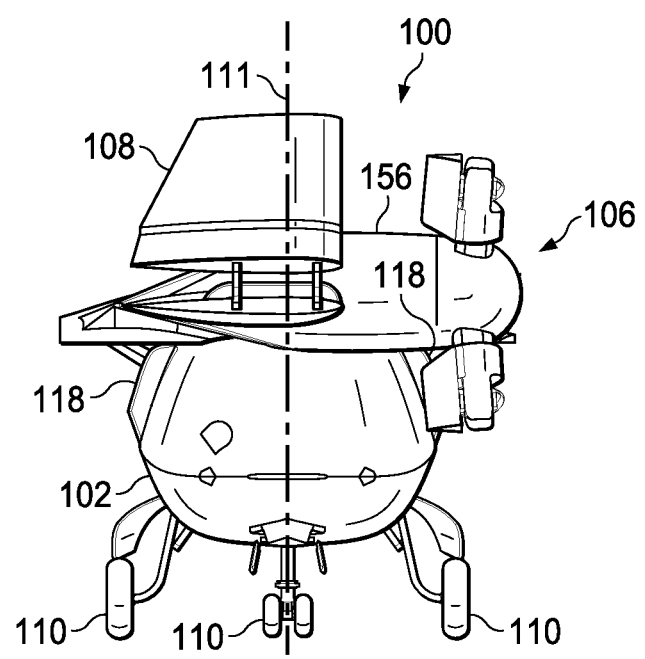
FIG. 6 is a front view of the aircraft of FIG. 1 with the aircraft in a folded configuration.
Figure 7:
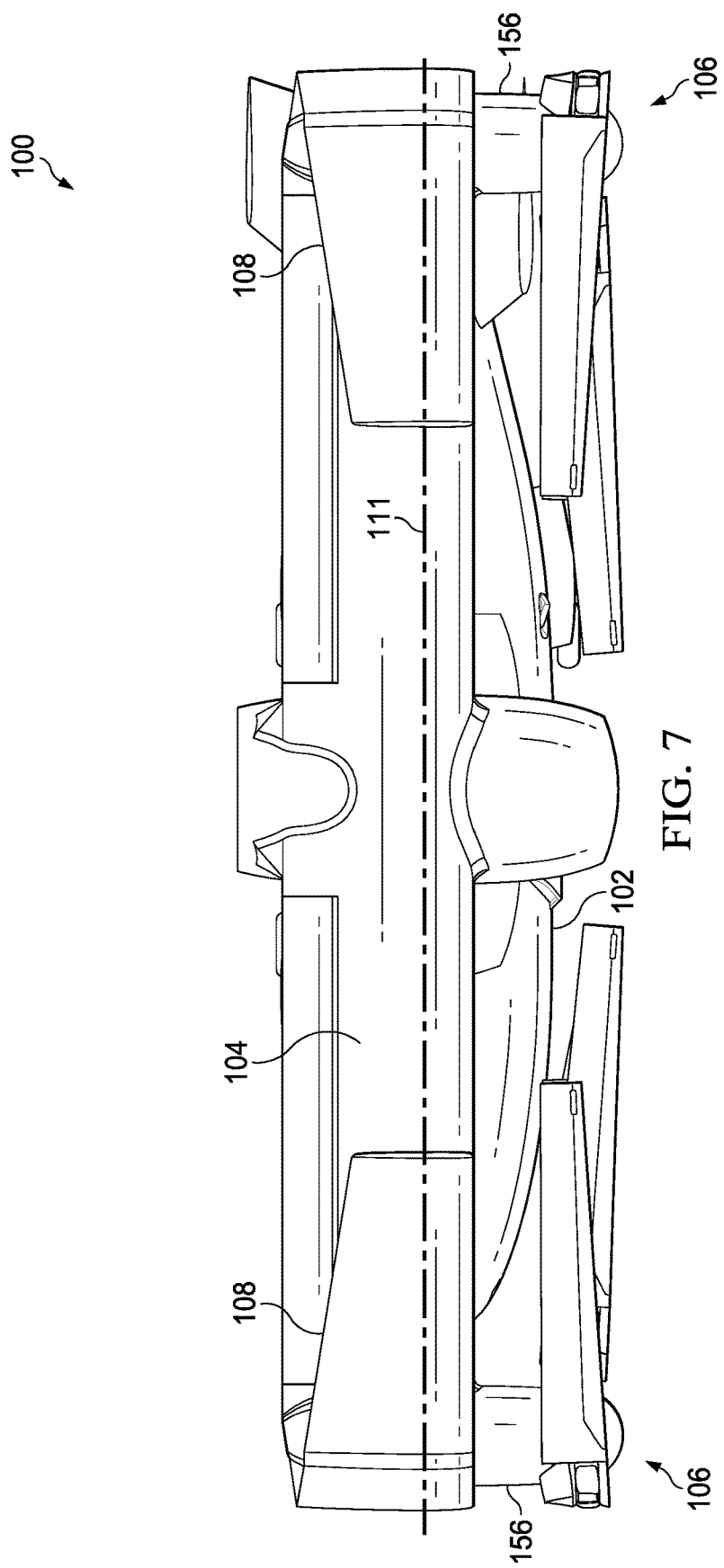
FIG. 7 is a top view of the aircraft of FIG. 1 with the aircraft in a folded configuration.
Figure 8:
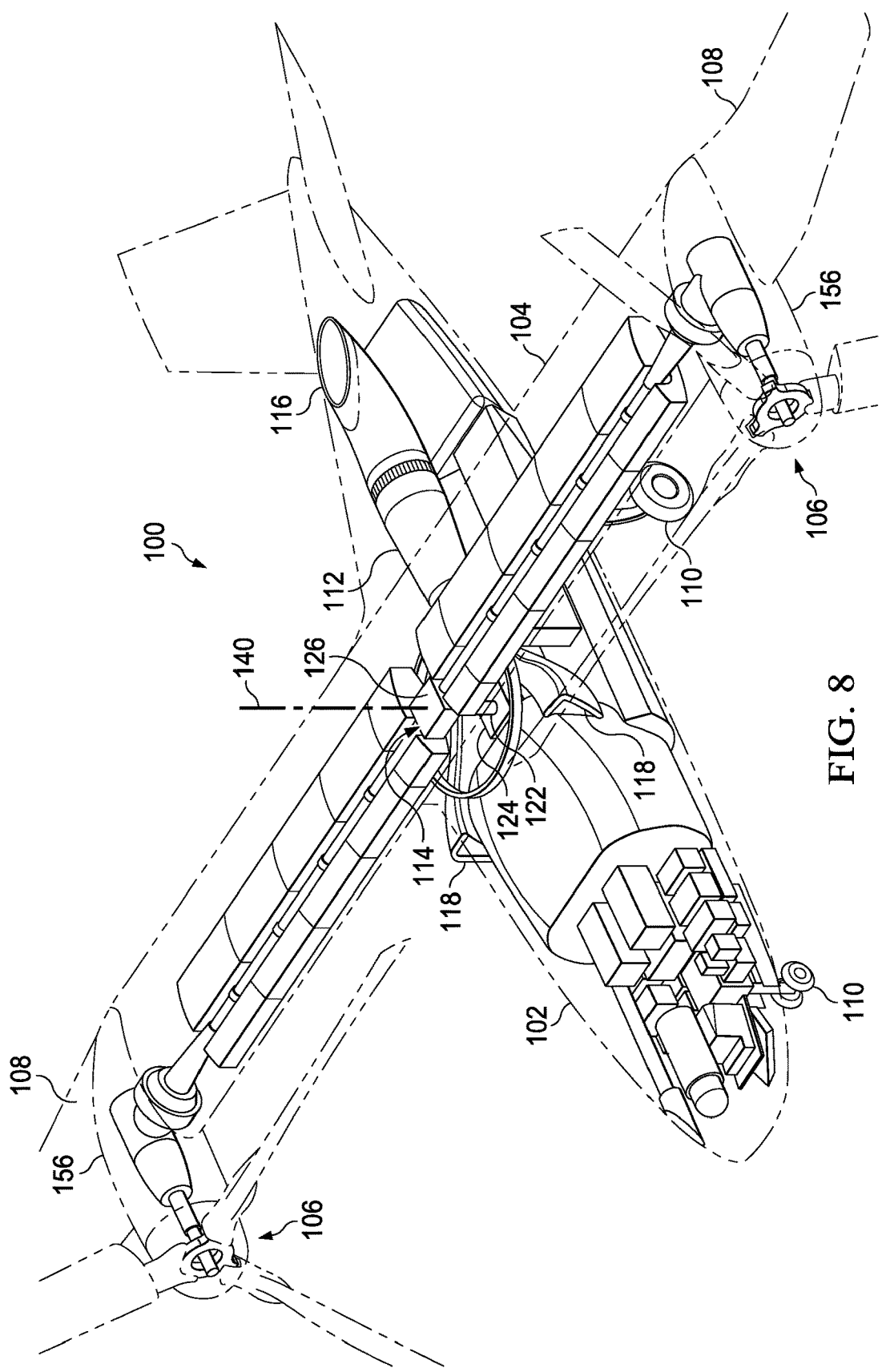
FIG. 8 is a partial oblique top right view of the aircraft of FIG. 1 showing internal components of the aircraft.
Figure 9:
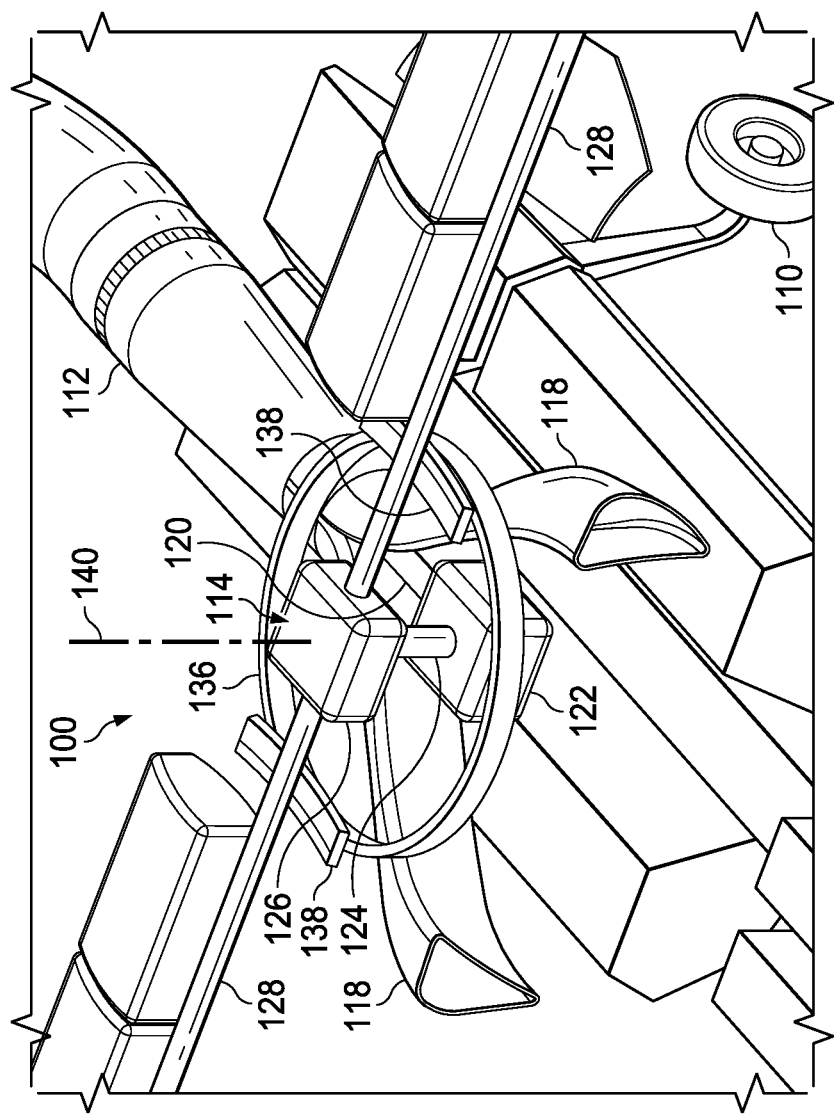
FIG. 9 is another oblique top right view of the aircraft of FIG. 1 showing internal components of the aircraft.
Figure 10:
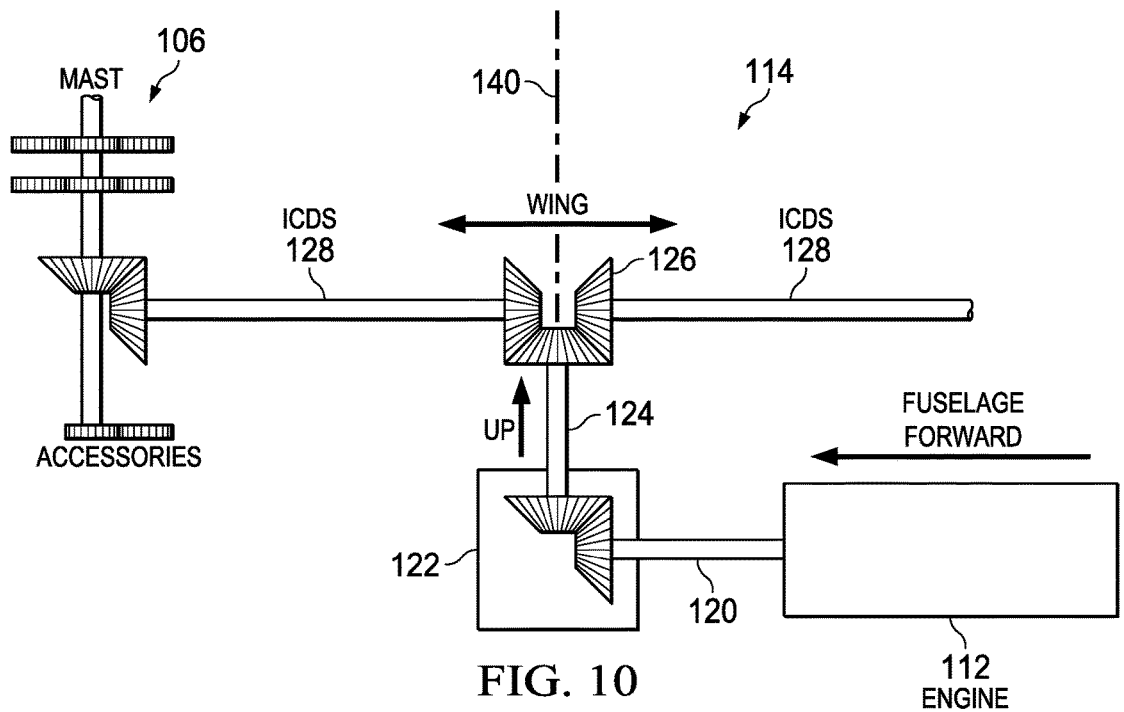
FIG. 10 is a partial schematic diagram of a drive system of the aircraft of FIG. 1.

Referring to FIGS. 1-7 in the drawings, an aircraft 100 is illustrated. The aircraft 100 comprises a tiltrotor unmanned aerial vehicle (UAV). The aircraft 100 comprises a fuselage 102, a rotatable wing 104, rotor systems 106, foldable wing extensions 108, and landing gear 110. The aircraft 100 is generally operable in a cruise mode as shown in FIGS. 1 and 2 in which the aircraft 100 orients the rotor systems 106 and wing extensions 108 to allow flight in a manner substantially similar to a fixed wing aircraft. The aircraft 100 is also operable in a vertical takeoff and landing (VTOL) mode as shown in FIGS. 3 and 4 in which the aircraft 100 orients the rotor systems 106 and wing extensions 108 to allow vertical takeoff and landing in a manner substantially similar to a helicopter. In this embodiment, the aircraft 100 can also operate in a transition mode in which the rotors systems 106 and wing extensions 108 are oriented in positions between the positions shown in the cruise mode and the VTOL mode. While aircraft 100 is shown as comprising rotatable wings 104, alternative aircraft embodiments may not include rotatable wings 104 and/or wing extensions 108. More specifically, in some embodiments, an aircraft may be provided that comprises a fuselage mounted engine and rotatable wings but does not comprise wing extensions.

Referring now to FIGS. 8-10, 12, and 13, the aircraft 100 further comprises an engine 112 and an associated drive system 114 configured to drive the rotor systems 106. The engine 112 is disposed within the fuselage 102 and is disposed substantially symmetrically in the left-right direction about a zero butt line 111 of the aircraft 100. The zero butt line 111 generally bisects the aircraft 100 into left and right portions. The engine 112 is connected to a centrally located exhaust outlet 116 and two air intakes 118. Similar to the engine 112, the exhaust outlet 116 is disposed substantially symmetrically in the left-right direction about the zero butt line 111. However, while the air intakes 118 are not generally centrally located, the air intakes 118 are disposed in a substantially symmetric manner in the left-right direction about the zero butt line 111. The drive system 114 comprises an engine driveshaft 120 that extends from the engine 112 substantially forward toward the front of the aircraft 100. The engine driveshaft 120 is connected to a direction change gearbox 122 configured to connect the longitudinally extending engine driveshaft 120 to a riser shaft 124 that extends substantially vertically from the direction change gearbox 122. In this embodiment, the direction change gearbox 122 is configured to transfer rotary motion between the engine driveshaft 120 and the riser shaft 124 despite the right angle between the engine driveshaft 120 and the riser shaft 124. In some embodiments, the direction change gearbox 122 comprises components configured to provide a shaft speed reduction so that the speed of the riser shaft 124 is slower than the speed of the engine driveshaft 120. The drive system 114 further comprises a power splitting gearbox 126 configured to receive rotation from the riser shaft 124 and transfer rotary motion to each of two interconnect driveshafts 128 that drive the rotor systems 106.

Figure 21:
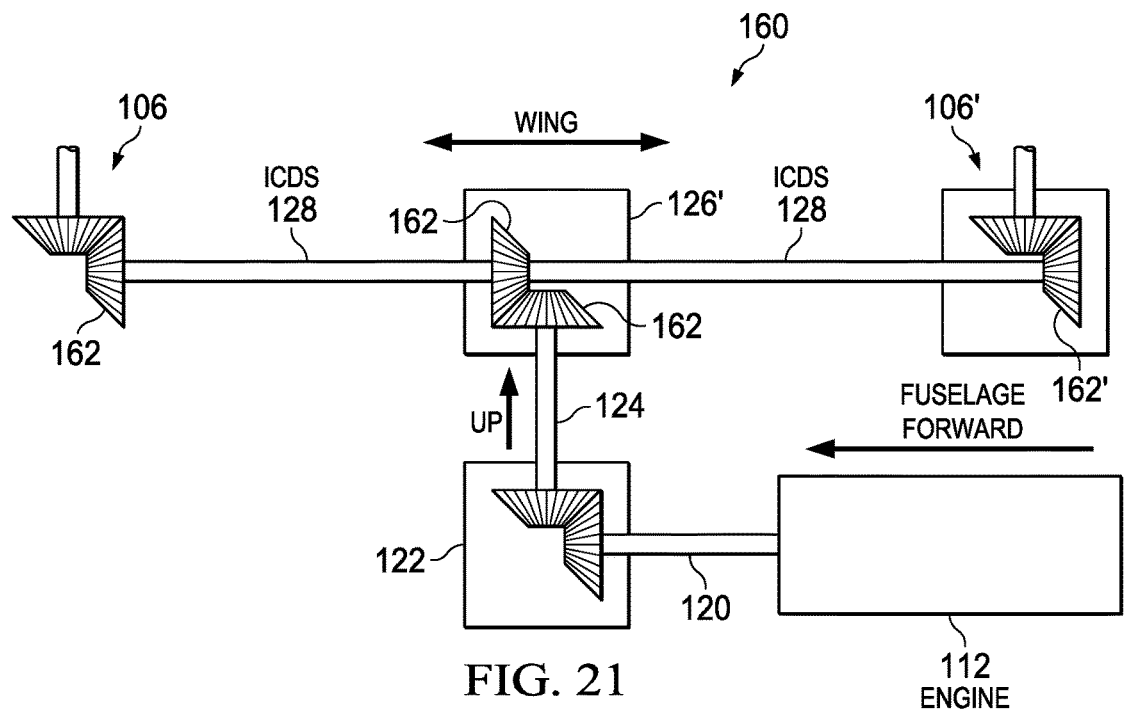
FIG. 21 is a partial schematic diagram of an alternative embodiment of a drive system.

Referring now to FIG. 21, an alternative embodiment of a drive system 160 is shown. The drive system 160 of FIG. 21 is substantially similar to drive system 114. However, the power splitting gearbox 126' comprises only two spiral bevel gears 162 rather than three and the rotor system 106' is associated with a gearbox 164' that comprises a spiral bevel gear 162' that is driven from an opposite side as compared to the denoted spiral bevel gear 162 of the rotor system 106. Because this embodiment utilizes a single spiral bevel connection (using two spiral bevel gears) in the power splitting gearbox 126', the interconnect driveshafts 128 rotate in the same direction. Accordingly, the gearbox 164' serves to provide a change of rotational direction for the rotor system 106'.

Figure 11:
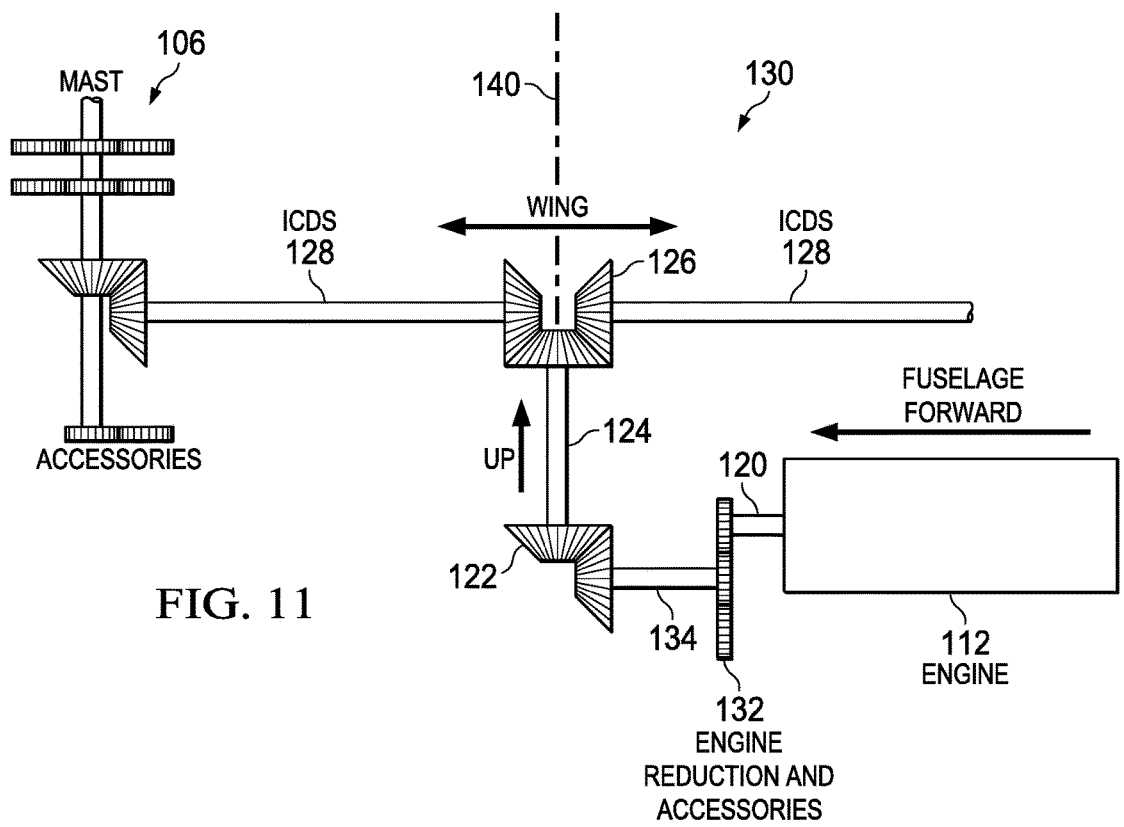
FIG. 11 is another partial schematic diagram of a drive system of the aircraft of FIG. 1.

Referring now to FIG. 11, another alternative embodiment of a drive system 130 is shown. The drive system 130 of FIG. 11 is substantially similar to drive system 114, but further comprises engine reduction components and/or accessories 132 and an intermediate shaft 134 that are used to join the engine driveshaft 120 to the direction change gearbox 122.

Referring back to FIGS. 8 and 9, the aircraft 100 further comprises a stow ring 136 that serves as a track and/or guide along which wing supports 138 can travel during rotation of the rotatable wing 104. In this embodiment, the rotatable wing 104 can rotate about a wing rotation axis 140 that is generally coincident with a central axis of the riser shaft 124.

Figure 12:
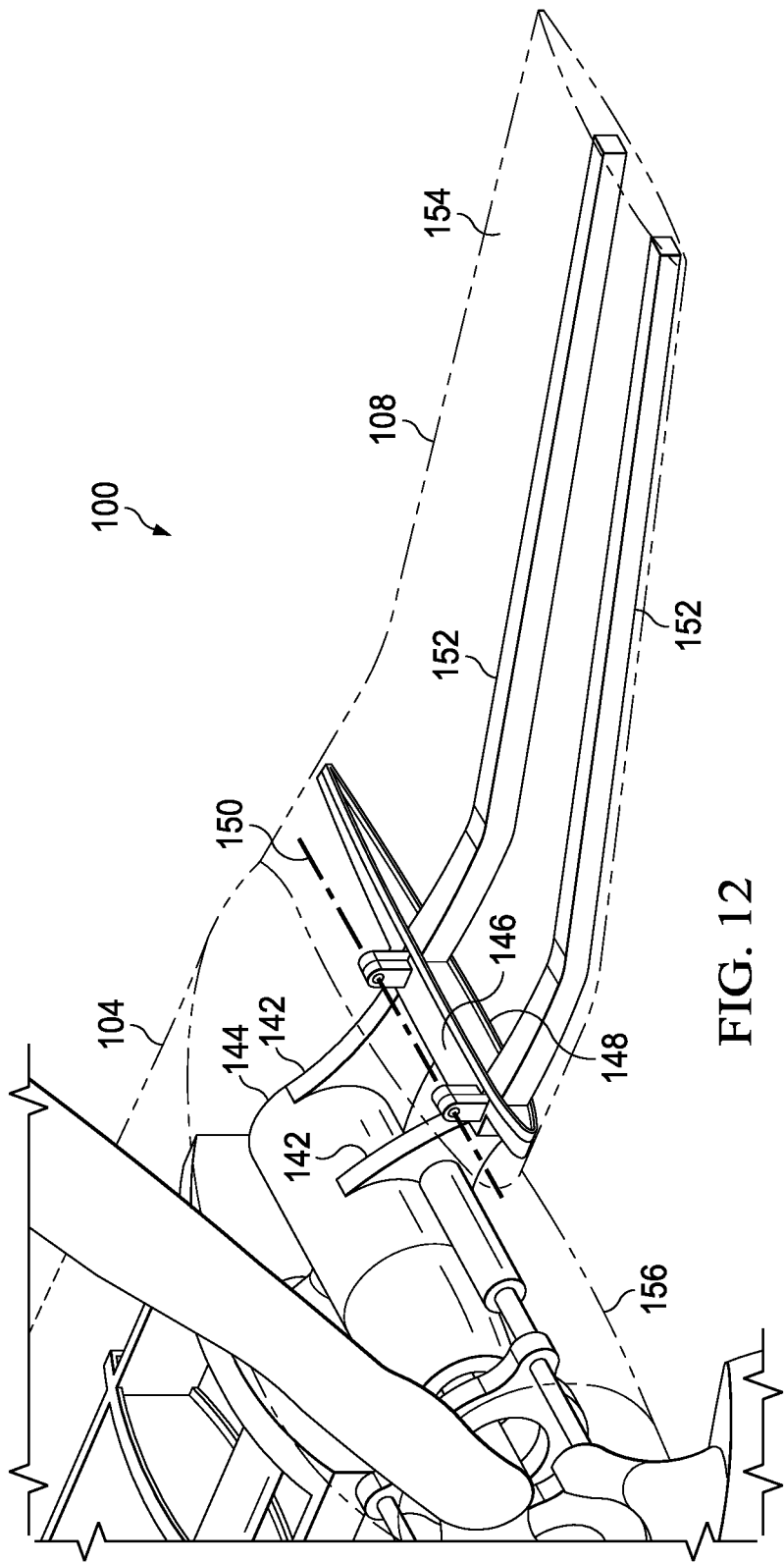
FIG. 12 is an oblique view of a wing extension of the aircraft of FIG. 1 with the wing extension in a deployed configuration.
Figure 13:
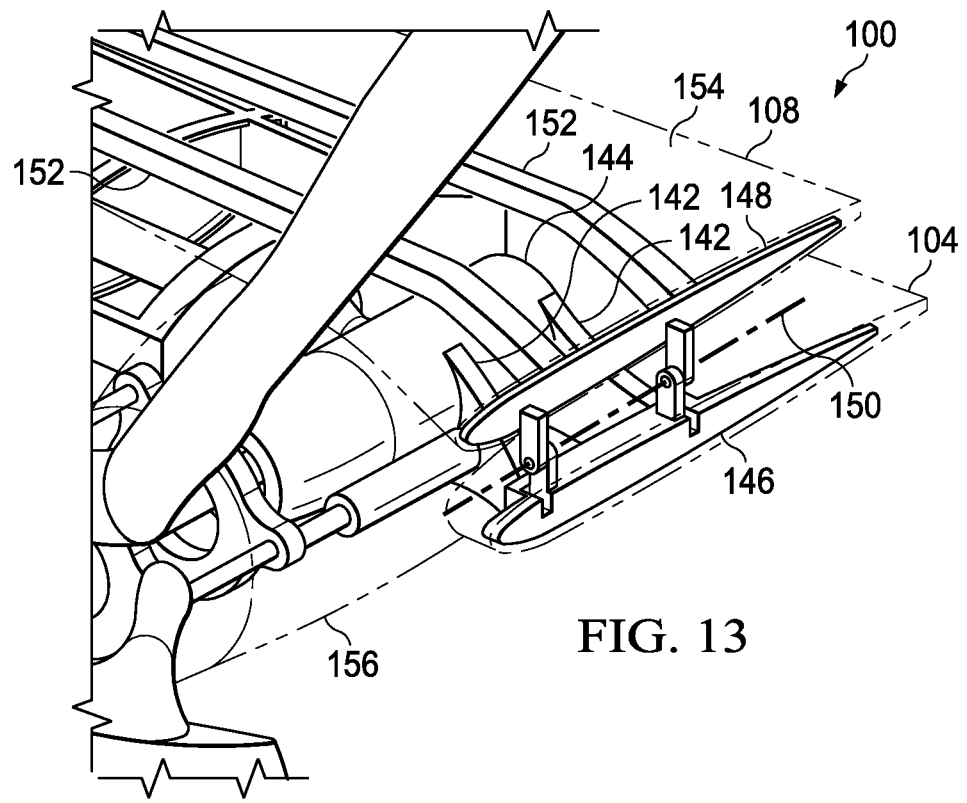
FIG. 13 is a partial oblique view of the wing extension of FIG. 12 with the wing extension in a folded configuration.
Figure 14:
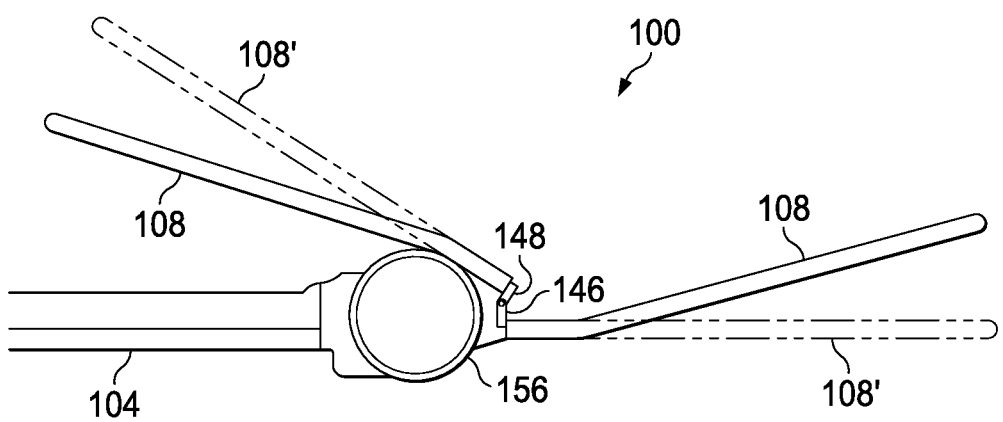
FIG. 14 is a schematic diagram comparing the locations of the wing extension of FIG. 12 in a folded configuration and in a deployed configuration.

Referring now to FIGS. 12-14, the wing extension 108 is shown in greater detail. Most generally, the wing extension 108 comprises at least one mount 142 connected to a proprotor gearbox 144 associated with a rotor system 106, a first hinge portion 146 connected to the mounts 142, and a second hinge portion 148 movably connected to the first hinge portion 146 about a hinge axis 150. The wing extension 108 further comprises one or more struts 152 connected to the second hinge portion 148. The struts 152 generally provide structural support for a skin 154 of the wing extension 108. With reference to FIG. 14, while the wing extension 108 comprises a dihedral configuration, in alternative embodiment, a wing extension 108' may comprise a straight configuration. As shown, in this embodiment, the dihedral shape of the wing extension 108 allows the wing extension to stow in a folded position so that the wing extension 108 can contact a pylon 156 carried by the wing 104 or other outer portion of wing 104 while fitting into a relatively smaller vertical and lateral envelope of space as compared to the straight wing extension 108'.

In some embodiments, the wing extensions 108 are provided to increase cruise efficiency without increasing rotor download excessively in hover, while still allowing the aircraft 100 the ability to fold and fit into confined spaces. The wing extensions 108 are generally horizontal when the aircraft 100 is in a cruise configuration. Because the wing extensions 108 are generally vertical in hover or VTOL configurations, the wing extensions 108 are generally streamline with the rotor system 106 thrust direction. The wing extension 108 does not attach directly to structural components of the wing 104, but rather, attach to components carried in the rotatable pylon 156. In alternative embodiments, wing extensions can comprise straight or anhedral shapes suitable for improved stowing. Further, in alternative embodiments, with differently shaped pylons 156 or other structures, the wing extensions can be shaped to complement the differently shaped pylons and/or structures so that the wing extensions nest against or otherwise abut the pylons and/or other structures in a space efficient manner when folded. In some embodiments, manual pinning and folding/unfolding of the wing extensions 108 can be utilized. However, in alternative embodiments, automated and/or automatic locking/unlocking and folding/unfolding may be utilized.

Figure 15:
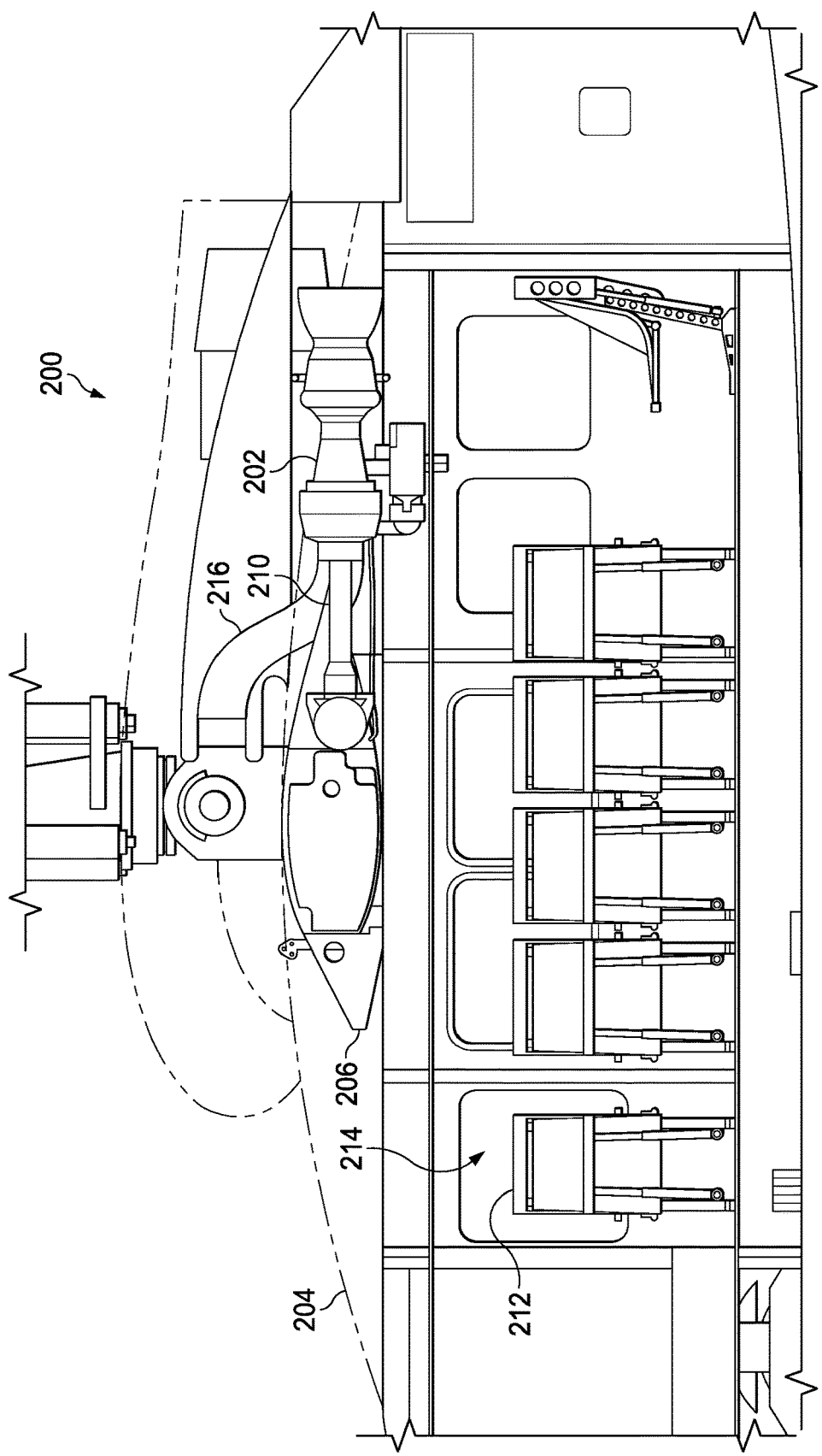
FIG. 15 is a partial right view of an aircraft according to another embodiment showing internal components of the aircraft.
Figure 16:
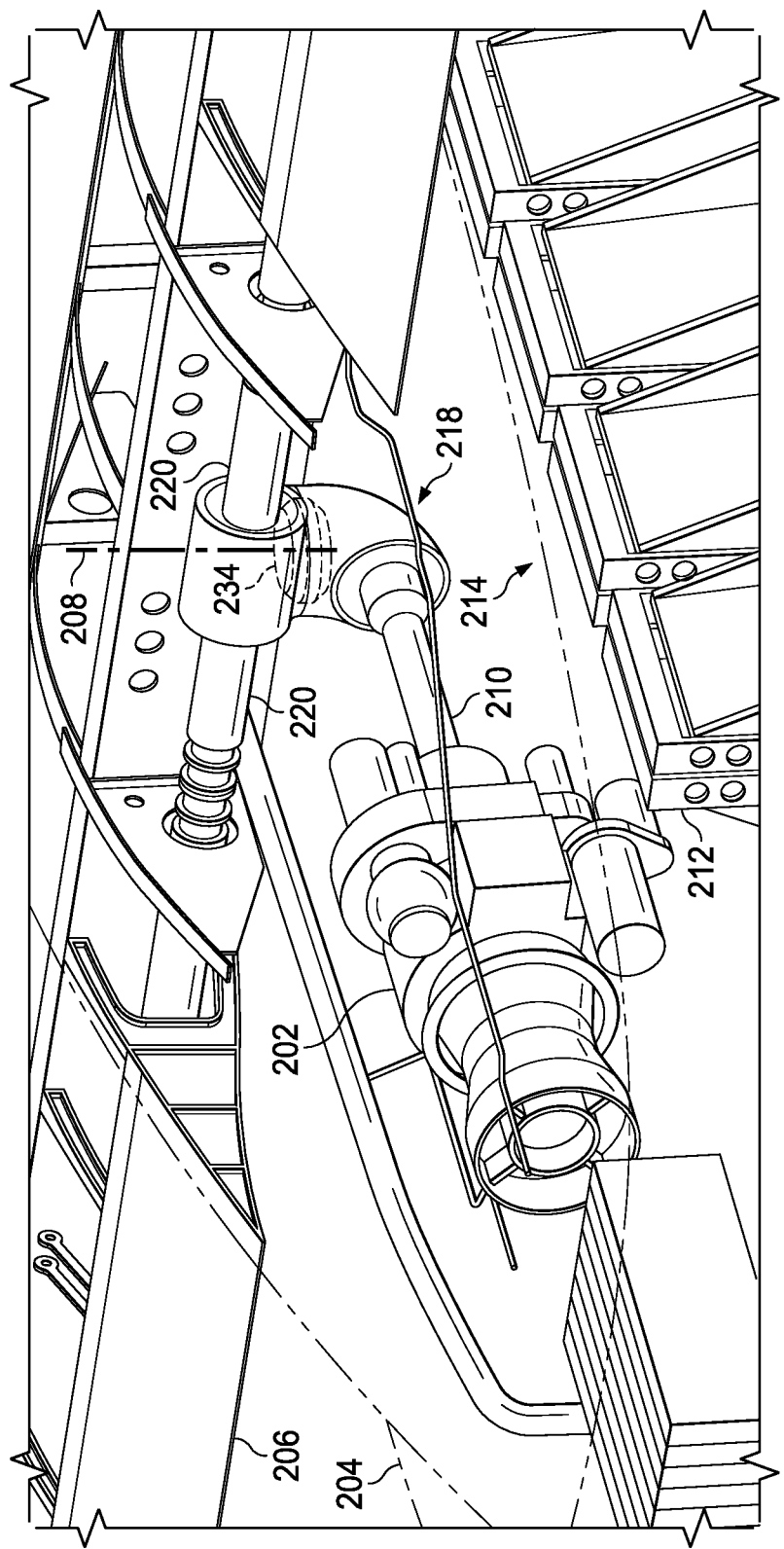
FIG. 16 is an oblique top right view of the aircraft of FIG. 15 showing internal components of the aircraft.
Figure 17:
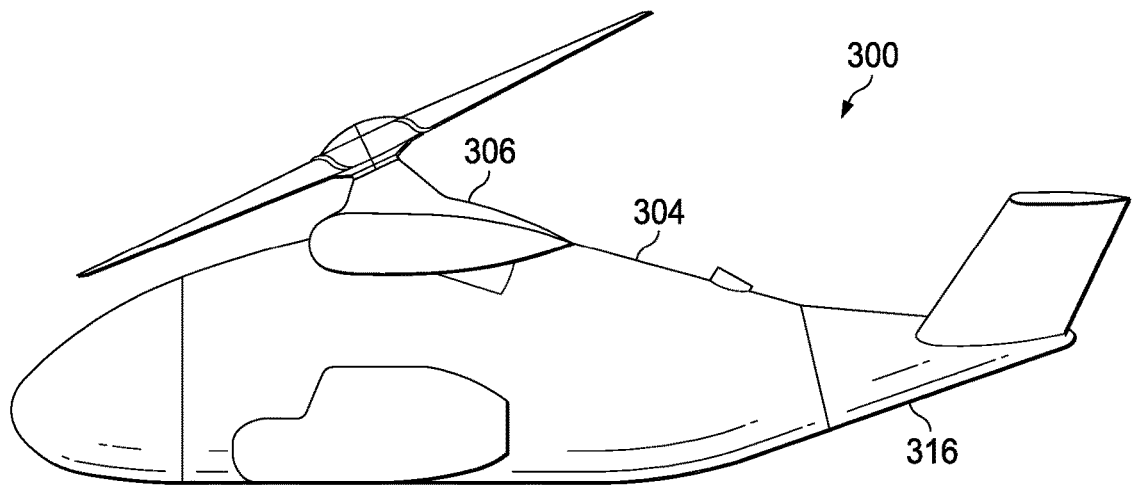
FIG. 17 is a right side view of an aircraft according to another embodiment with the aircraft in a flight configuration.
Figure 18:
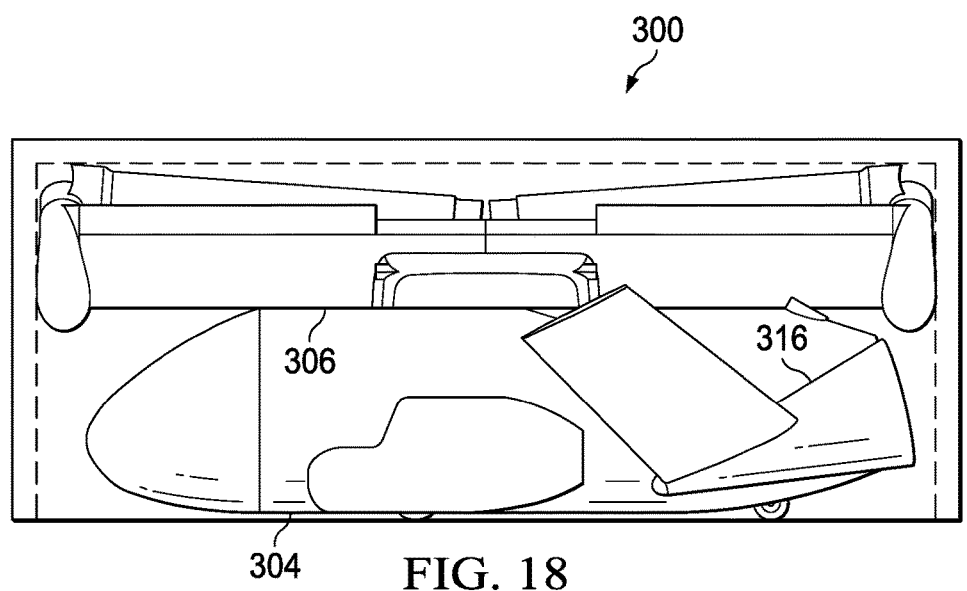
FIG. 18 is a right side view of the aircraft of FIG. 17 in a folded configuration.
Figure 19:
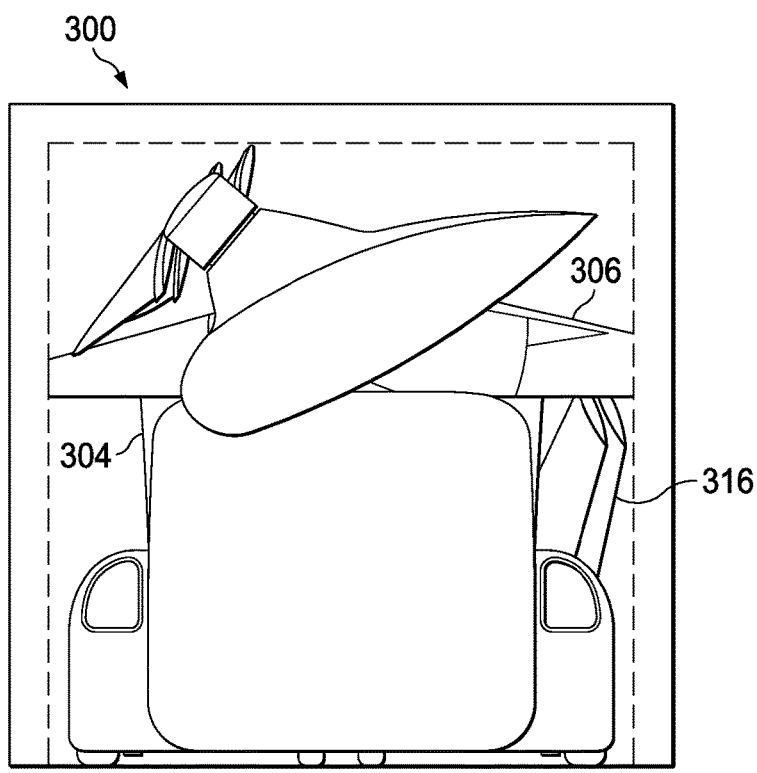
FIG. 19 is a front view of the aircraft of FIG. 17 in a folded configuration.
Figure 20:
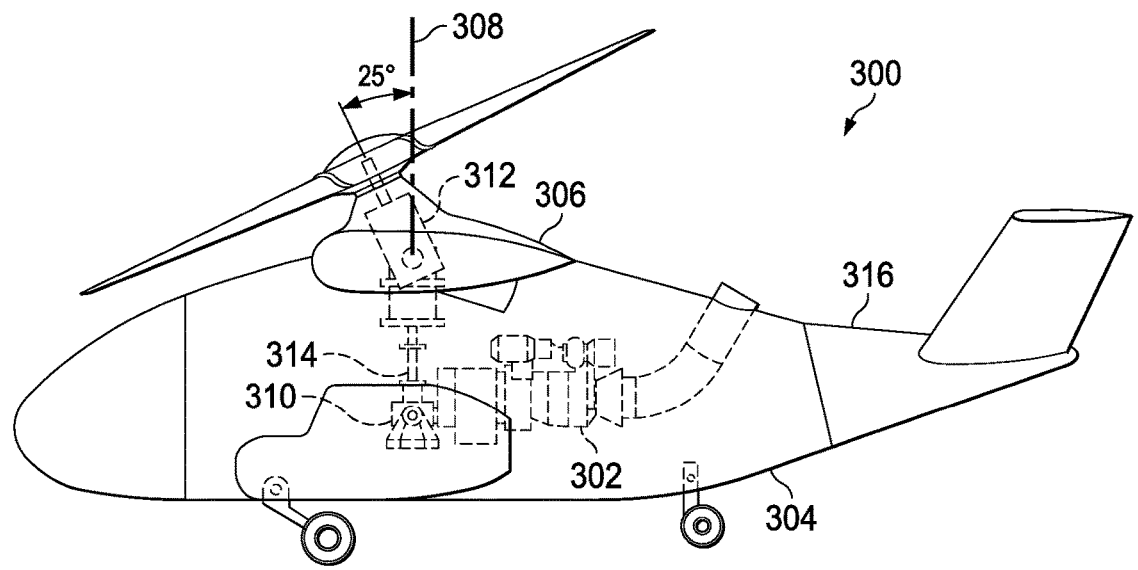
FIG. 20 is a right side schematic view of the aircraft of FIG. 17 showing internal components of the aircraft.

Referring now to FIGS. 15 and 16, an alternative embodiment of an aircraft 200 is shown. The aircraft 200 is substantially similar to aircraft 100 insofar as the aircraft 200 comprises an engine 202 disposed within a fuselage 204 in a symmetrical manner about a zero butt line, a rotatable wing 206 that rotates about a wing rotation axis 208, and an engine driveshaft 210 that extends forward from the engine 202 along the zero butt line. However, in this embodiment, the aircraft 200 is configured as a manned aircraft and comprises seats 212 and space within a cabin 214. In this embodiment, the engine 202 and driveshaft 210 are disposed above the cabin 214 but still within the fuselage 204. The aircraft 200 further comprises an air inlet duct 216 above the wing 206. Still further, the aircraft 200 comprises a spiral bevel gearset 218 that transfers power from the engine 202 to the interconnect driveshafts 220. At least a portion of the gearset 218 and/or associated shafts extends along the wing rotation axis 208.

Figure 22:
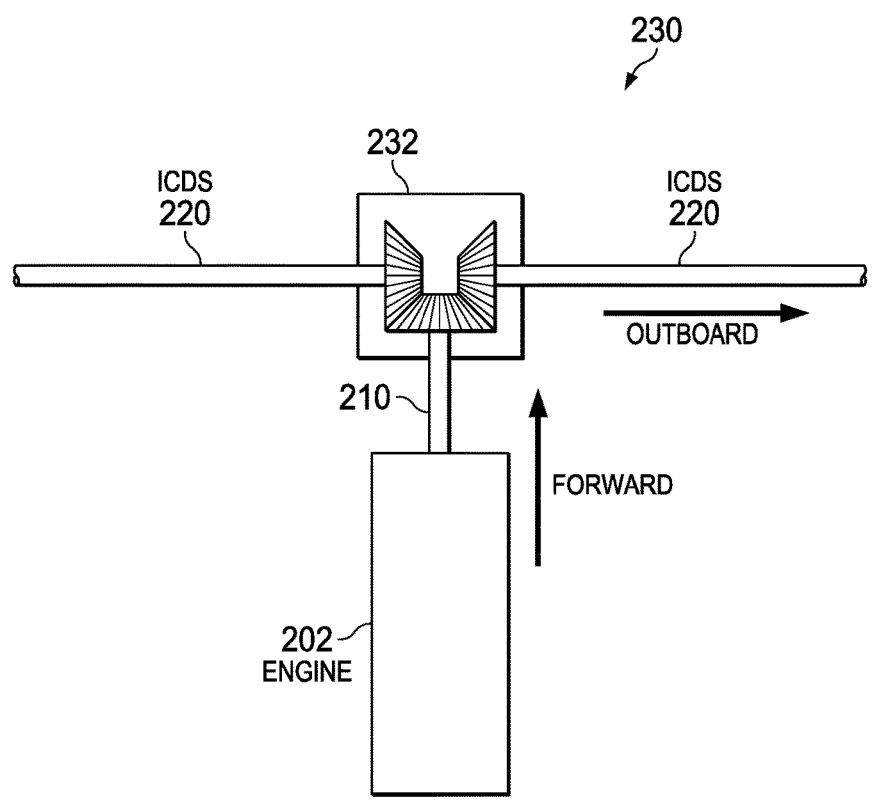
FIG. 22 is a partial schematic diagram of another alternative embodiment of a drive system.

Referring now to FIG. 22, an alternative embodiment of a drive system 230 is shown that can be used in an aircraft substantially similar to the aircraft 200 but which does not include the rotational functionality of the rotatable wing 206. In such an embodiment, the engine 202 and associated driveshaft 210 may be substantially in-line and/or vertically aligned with the interconnect driveshafts 220 so that a single spiral bevel gearbox 232 can be used to join the driveshaft 210 to the interconnect driveshafts 220 without the use of a riser shaft, an additional gearbox, and/or an additional spiral bevel (such as the spiral bevel gears 234 identified in FIG. 16).

Referring now to FIGS. 17-20, an alternative embodiment of an aircraft 300 is shown. The aircraft 300 is substantially similar to aircraft 100 insofar as the aircraft 300 comprises an engine 302 disposed within a fuselage 304 in a symmetrical manner about a zero butt line, a rotatable wing 306 that rotates about a wing rotation axis 308, and an engine driveshaft that extends forward from the engine 302 along the zero butt line. However, in this embodiment, the aircraft 300 comprises a direction change gearbox 310 connected to a midwing spiral bevel gearbox 312 via a riser shaft 314. The gearbox 312 allows the wing 306 to rotate about the wing rotation axis 308 as well as to rotate up to about 25 degrees in a forward-backward rotation to allow transition between cruising and hovering modes of operation. At least a portion of the gearset 218 that drives the interconnect driveshafts 220 extends upward along the wing rotation axis 308. The aircraft 300 is generally configured to receive a joint modular intermodal container in a front portion of the fuselage 304 and the aircraft 300 is further configured to fit within a standard cargo container, such as, but not limited to a cargo container comprising a height of 96 inches, a width of 96 inches, and a depth of 240 inches. Still further, the tail 316 of the aircraft 300 is foldable.

While each of the aircraft 100, 200, 300 have unique features that are not shared with each other, some features are shared with each of the aircraft 100, 200, 300. Some of the shared features between aircraft 100, 200, 300 are that the wings 104, 204, 306 are rotatable about their respective wing rotation axes and that at least one component that drives the respective interconnect driveshaft is disposed along the respective wing rotation axis. By locating at least one of the shafts, gearboxes, spiral bevel gears, and/or other drive components along the wing axis of rotation, and in some embodiments centered within a stow ring, aircraft having both an engine disposed in the fuselage and a rotatable wing can be provided. In some embodiments, the wing axis of rotation aligns with the engine driveshaft centerline and the engine output transitions directly to a 90 degree bevel box that provides speed reduction and transfers the power to a vertical riser shaft. The length of the vertical riser shaft can be selected to allow vertical alignment of an engine at various heights within the fuselage. In some embodiments, the riser shaft can connect to a dual spiral bevel gearbox that drives the interconnect drives shafts that drive the rotor systems. In some embodiments, an engine may first connect to a reduction gearbox that can also support power and hydraulic accessories. In some embodiments, a clutch can be provided in line with a spiral bevel, gearbox, and/or shaft to allow selective disengagement of the drive systems from the engine and to prevent rotation of the engines when rotating the wings about the wing axis of rotation.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising:
   a fuselage;
   an engine disposed within the fuselage;
   a rotatable wing disposed above the fuselage and selectively rotatable about a wing rotation axis;
   a plurality of interconnect driveshafts disposed within the rotatable wing;
   wherein at least one drive system component that is connected between the engine and the interconnect driveshaft is disposed along the wing rotation axis;
   an engine driveshaft connected to the engine, at least a portion of the engine driveshaft being located vertically lower than at least one of the interconnect driveshafts;
   a direction change gearbox connected to the engine driveshaft; and
   a riser shaft connected to the direction change gearbox; wherein the riser shaft is at least partially located vertically between the direction change gearbox and at least one of the interconnect driveshafts.

2. The aircraft of claim 1, wherein the at least one drive system component comprises a spiral bevel gearbox.

3. The aircraft of claim 1, further comprising:
   a power splitting gearbox connected between the riser shaft and at least one of the interconnect driveshafts.

4. The aircraft of claim 3, further comprising:
   a stow ring, wherein the power splitting gearbox is disposed at least partially centered within the stow ring of the aircraft.

5. The aircraft of claim 4, wherein the power splitting gearbox is connected to two interconnect driveshafts.

6. The aircraft of claim 5, wherein the power splitting gearbox drives the two interconnect driveshafts in opposite directions of rotation.

7. The aircraft of claim 5, wherein the power splitting gearbox drives the two interconnect driveshafts in the same direction of rotation.

8. An aircraft, comprising:
   a rotatable wing selectively rotatable about a substantially vertical wing rotation axis;
   a plurality of interconnect driveshafts disposed within the rotatable wing;
   at least a portion of an engine driveshaft disposed vertically lower than at least one of the interconnect driveshafts;
   a direction change gearbox connected to the engine driveshaft; and
   a riser shaft connected to the direction change gearbox, wherein the riser shaft is at least partially located vertically between the direction change gearbox and at least one of the interconnect driveshafts.

\* \* \* \* \*